March 15, 1949.  G. A. FLEISCHMANN  2,464,495
SUPPORT AND TOWING DEVICE FOR
TWO-WHEELED VEHICLES
Filed Sept. 28, 1946

GEORGE A. FLEISCHMANN
INVENTOR.

BY George A. Evans
ATTORNEY

Patented Mar. 15, 1949

2,464,495

UNITED STATES PATENT OFFICE 2,464,495

SUPPORT AND TOWING DEVICE FOR TWO-WHEELED VEHICLES

George A. Fleischmann, Milwaukee, Wis., assignor to Chain Belt Company, Milwaukee, Wis., a corporation of Wisconsin Application September 28, 1946, Serial No. 700,122

2 Claims. (Cl. 280—33.4)

1

This invention relates to two-wheeled vehicles and provides means for preventing them from tipping over under certain circumstances. More specifically it relates to a "tip-over stop" for a two-wheeled trailer of the type commonly used for mounting a concrete mixer, in which because of the bulky nature of the machine and relatively high center of gravity, the damage resulting from over-turning is rather great.

These trailer type mixers usually have their single axle in back of the center of gravity with the towing tongue which extends forwardly exerting a downward force on the towing vehicle. Legs or outriggers are mounted on the forward side of the center of gravity and support the vehicle when the towing tongue is disconnected. These legs are either short enough so that they clear the ground while the trailer is being towed, or else they are adjustable in their supports so that they can be elevated from the ground when the tongue is connected to the towing vehicle.

Concrete mixers mounted on such vehicles are usually charged from one end of the vehicle and discharged from the other end; as a result, the two ends must be accessible for such purposes and hence the towing pole is either removed or otherwise adjusted so that it is out of the way of such operations.

To prevent the vehicle from tipping over backward on account of some unexpected circumstance, it has been the practice to provide a second set of outriggers or legs on the back side of the wheels, the latter being adjustable so that they may be let down to rest on the ground, or else they are firmly mounted with their lowermost portion slightly elevated from the ground when the vehicle is being towed, but sufficiently close to the ground to arrest backward movement should the center of gravity pass over the axle of the two wheels.

These latter legs in back of the wheels interfere with accessibility to the mixer if it is of the end discharge type. If the concrete is being carted from the mixer, the operators of the wheelbarrows must either go around the legs or else come in and leave the mixer only at right angles to the axle.

The present invention is based on the realization that the only time there is any substantial danger of tipping over the vehicle backward is when the towing tongue is attached and the front end is thereby elevated. According to the present invention, a removable towing tongue is provided which extends through the vehicle and a sufficient distance behind it, so that the rearward

2 end of the tongue may act as a stop or leg to arrest complete over-turning of the vehicle.

This results in less manufacturing cost because it is a simpler construction. It also makes the rear end of the machine more accessible because when the tongue is removed there is nothing extending backward of the wheels.

An embodiment of the invention is illustrated in the accompanying drawings wherein.

Figure 1:
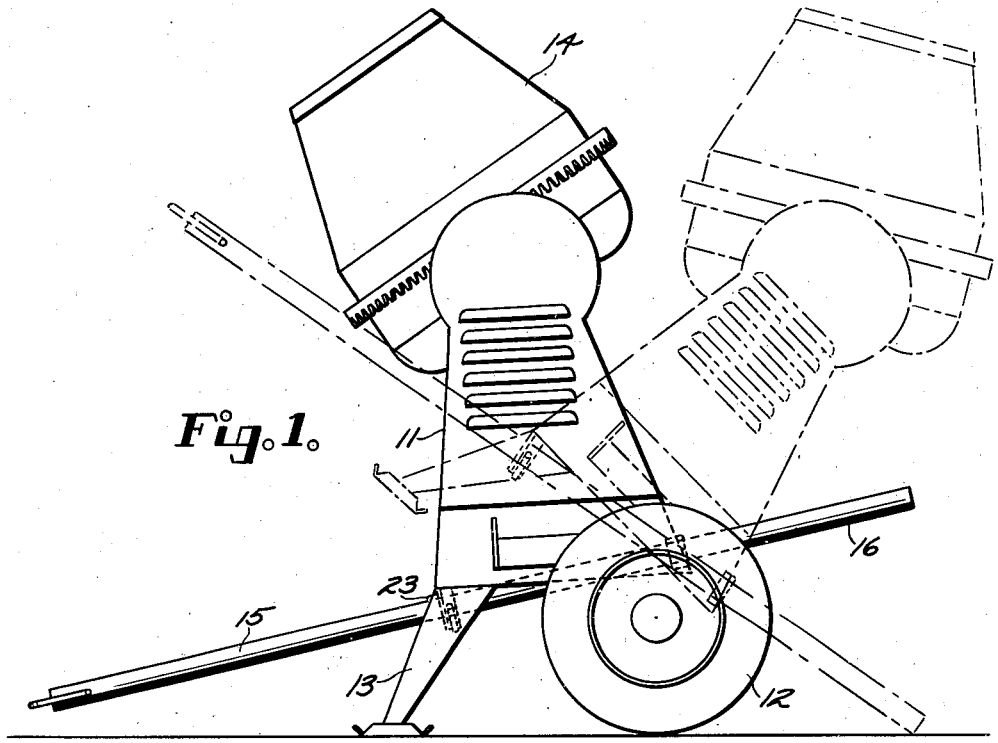
Fig. 1 is a side elevation of an end discharge concrete mixer mounted on a two-wheeled trailer.
Figure 3:
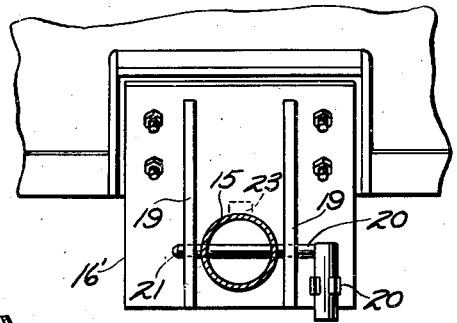
Fig. 3 is a section taken on line 3—3 of Fig. 2.

Referring to Fig. 1 of the drawings, the full line position shows the mixer generally designated 11 resting on its wheels 12 and the forward legs 13. The center of gravity of the vehicle is somewhere between the wheels and the legs 13. The mixer drum 14 is of the type that revolves to mix and may be tilted forward or backward so as to pour out its contents on completion of the mixing period. The details of the mixer form no part of this invention and are so well known in the art that no further description is necessary.

Extending through the frame of the mixer and preferably about midway between the wheels, is a towing pole or tongue 15, the forward end of which may carry an eye or other means permitting it to be secured to whatever towing means may be employed. In Fig. 1, the tongue is shown in the position it occupies when the trailer is resting on the legs 13. To tow the vehicle, the front end of the tongue is slightly elevated to an approximately horizontal position, thereby tilting the vehicle backward and clearing the legs 13 from the ground.

In the machine illustrated by the drawings, the center of gravity is fairly close to the axle of the wheels when the vehicle is in towing position, and there is some danger that the workman in lifting the front end of the tongue may exert too much force and the machine will go over backward. It is also possible that the workman in pushing the machine backward and using the tongue as a steering means may bump into a curb which would produce the same result.

To prevent tipping over, the tongue extends through and beyond the back of the trailer, the rearwardly extending portion 16 being sufficiently long so that the machine can only move to the dotted line position shown in Fig. 1 before the rearward extremity of the tongue will strike the ground and arrest further backward tipping movement.

Figure 2:
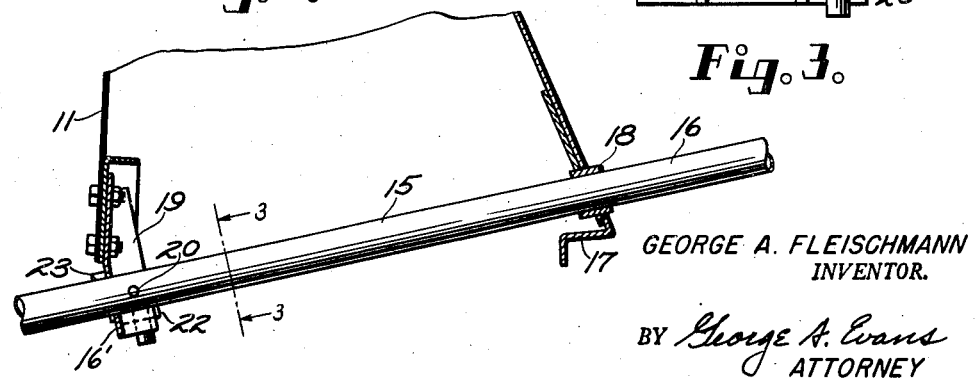
Fig. 2 is an enlarged side elevation of a portion of the machine shown in Fig. 1, with certain parts broken away.

Fig. 2 illustrates how the tongue may be anchored in the trailer, a bracket 16' on the forward frame member being apertured to accommodate it, and the channel 17 at the rear of the vehicle frame containing a sleeve 18, which is aligned with the aperture in the bracket 16'. The construction permits the tongue to be slid axially through the two longitudinally aligned apertures thus provided to the position illustrated in the drawing.

When the towing pole is locked within the longitudinally disposed fitting provided as above, and the trailer is resting on the extension means 13, the axis of the pole is inclined as illustrated in Fig. 1, and the pole serves not only as a lever arm to tilt the vehicle about the axle of the wheels to elevate the means 13 to towing position, but also as a stop, to prevent backward tipover, should the vehicle be tilted to an extent where the center of gravity shifts across the trailer axis.

To prevent axial movement of the tongue when in this position, flanges 19 extending rearward from the bracket 16' are arranged on either side of the tongue, and an elbow shaped locking pin 20 is inserted through aligned apertures in the flanges 19 and a suitably located aperture in the tongue 16. One end of the pin 20 is tapered as at 21 to make it easier to move the pin through the apertures in the brackets and the tongue, and the bent portion of the pin is arranged for movement, as the pin is rotated, to permit it to be retained in a spring clip latch or keeper 22 which is mounted on the bracket 16'. The construction permits the pin 20 to be firmly secured in the latch whether the towing pole is in place or not, and this tends to prevent the pin from being lost when the towing pole is removed.

A stop 23 mounted on the towing tongue suitably spaced ahead of the aperture through which the pin 20 is inserted is arranged to abut the bracket 16' and indicates that the aperture is in position for accommodation of said pin. As soon as the vehicle is spotted in the position where it will be used, the pin 20 is lifted from its keeper and pulled out of the tongue, and the tongue is then removed from the vehicle by moving it axially forward.

With the tongue removed, and the vehicle resting on the front legs 13, there is no danger of the machine tipping over backward, as the center of gravity in this position is considerably ahead of the rear axle and the machine would not be moved unless the tongue were again inserted and locked in the fitting, in which event it provides the only tip-over stop required.

I claim:

1. In a two-wheeled trailer type vehicle having a concrete mixing drum mounted thereon which is to be charged at one end of the vehicle and discharged at the other end thereof, an axle for said vehicle disposed transversely thereof adjacent one of said ends and provided with laterally spaced ground-engaging wheels; supporting members depending from the other end of the vehicle for engagement with the ground adjacent such end, in positions to afford ready access to the drum, said members being adapted to support the apparatus in an operating position in which its center of gravity is disposed between the vertical planes of said axle and members, the vehicle being swingable about the axle to elevate the supporting members for ground traverse of the vehicle; a tongue-receiving fitting mounted on the vehicle intermediate said wheels; a tongue for effecting said swinging movement and ground traverse of the vehicle, disposed longitudinally of the vehicle and positioned in said fitting with one of its ends projecting beyond the axle end of the vehicle to provide a stop adapted to prevent tip-over of the vehicle should its center of gravity be shifted across the plane of the axle; and means readily removably securing the tongue in the fitting in said position, whereby the tongue may be removed when the apparatus is in its said operating position and thus afford ready access to the drum at the axle end of the vehicle.

2. In a two-wheeled trailer type vehicle having a concrete mixing drum mounted thereon which is to be charged at one end of the vehicle and discharged at the other end thereof, an axle for said vehicle disposed transversely thereof adjacent one of said ends and provided with laterally spaced ground-engaging wheels; supporting members depending from the other end of the vehicle for engagement with the ground adjacent such end, in positions to afford ready access to the drum, said members being adapted to support the apparatus in an operating position in which its center of gravity is disposed between the vertical planes of said axle and members, the vehicle being swingable about the axle to elevate the supporting members for ground traverse of the vehicle; a tongue-receiving fitting mounted on the vehicle intermediate said wheels; a tongue disposed longitudinally of the vehicle and slidably received in said fitting; and means readily removably securing the tongue in the fitting with each of its ends projecting beyond the corresponding end of the vehicle, whereby the portion of the tongue extending from the axle end may prevent tip-over of the vehicle should its center of gravity be shifted outside the plane of the axle, while the portion of the tongue extending from the other end of the vehicle may serve to effect said swinging movements and ground traverse thereof, said tongue being readily removable from the fitting to afford ready access to the drum at both ends of the vehicle when the apparatus is in its said operating position.

GEORGE A. FLEISCHMANN.

REFERENCES CITED

The following references are of record in the file of this patent:

UNITED STATES PATENTS

| Number | Name | Date |
|---|---|---|
| 1,471,548 | Clement | Oct. 23, 1923 |
| 1,487,464 | Morrison | Mar. 18, 1924 |
| 1,598,084 | Kingham et al. | Aug. 31, 1926 |
| 1,748,976 | Davis et al. | Mar. 4, 1930 |
| 1,775,652 | Mosby | Sept. 16, 1930 |
| 1,794,630 | Linn | Mar. 3, 1931 |
| 1,908,704 | Hamren | May 16, 1933 |